US009275109B2

(12) United States Patent
Joshi et al.

(10) Patent No.: US 9,275,109 B2
(45) Date of Patent: Mar. 1, 2016

(54) AD-HOC TEMPORARY RECORD RELATIONSHIP MANAGEMENT

(71) Applicant: SugarCRM Inc., Cupertino, CA (US)

(72) Inventors: Akshay Joshi, Mississauga (CA); David Tam, Elk Grove, CA (US)

(73) Assignee: SugarCRM Inc., Cupertino, CA (US)

( * ) Notice: Subject to any disclaimer, the term of this patent is extended or adjusted under 35 U.S.C. 154(b) by 165 days.

(21) Appl. No.: 13/767,679

(22) Filed: Feb. 14, 2013

(65) Prior Publication Data

US 2014/0229499 A1 Aug. 14, 2014

(51) Int. Cl.
*G06F 17/30* (2006.01)
(52) U.S. Cl.
CPC .... *G06F 17/30477* (2013.01); *G06F 17/30533* (2013.01); *G06F 17/30038* (2013.01)
(58) Field of Classification Search
None
See application file for complete search history.

(56) References Cited

U.S. PATENT DOCUMENTS

2010/0082576 A1* 4/2010 Walker et al. ................. 707/706

* cited by examiner

*Primary Examiner* — Hung Q Pham
(74) *Attorney, Agent, or Firm* — Steven M. Greenberg, Esq.; CRGO Law

(57) ABSTRACT

A method for ad hoc temporary record relationship management includes selecting an instance of a data object persisted in a database of a database driven application and creating a different instance of a different data object referencing the selected instance of the data object and relating the selected instance of the data object to an instance of yet a further data object also persisted in the database. The method also includes storing the created different instance of the different data object in a collection of instances of the different data object and querying the collection of instances of the different data object for a particular instance of the further data object. Of note, the querying can produce a result set of data objects related to the particular instance of the further data object. Finally, the method includes processing the result set in the database driven application.

15 Claims, 2 Drawing Sheets

AD-HOC TEMPORARY RECORD RELATIONSHIP MANAGEMENT

BACKGROUND OF THE INVENTION

1. Field of the Invention

The present invention relates to database relationships between records and more particularly to record relationship management in a database driven application.

2. Description of the Related Art

Databases are designed to offer an organized mechanism for storing, managing and retrieving information. Databases exist in the most rudimentary form of a flat file in which each line of the file is a record and each number or string separated by a pre-determined delimiter is a field of the record. More advanced databases organize data through the use of structured tables able to be managed by way of a database management system ("DBMS"). Modern databases are organized through a number of different technological paradigms, including relational models (relational database), object models (object database), document models (document database), and the like. In most cases, the structure and organization of data in the database (namely the different tables, and records and fields defined therein) conform to a pre-defined schema intended to model a problem and/or solution evidenced by the database.

With a database schema, relationships between records in a database are stored minimally by way of common keys and in more complex scenarios through linking records. The use of linking records simplifies the task of aggregating related data into a single view as is often the requirement in data driven applications. In the absence of linking records, complicated programmatic logic is required to conduct a number of database queries using various common keys in order to retrieve related data stored in the database. In the former circumstance, a priori knowledge of the relationship must exist so as to permit the proper initial specification of the database schema, and in the latter circumstance, a priori knowledge of the relationship must exist so as to permit the proper coding of the programmatic logic.

As it is well known, oftentimes, a priori knowledge of a data relationship is not known. Yet, where a priori knowledge of a data relationship is unknown at the time of database schema design or program coding, no automated mechanism exists to aggregated related data for access within a supported application. Consequently, one cannot a priori define and usage arbitrary relationships between data in a database.

BRIEF SUMMARY OF THE INVENTION

Embodiments of the present invention address deficiencies of the art in respect to database record relationship management and provide a novel and non-obvious method, system and computer program product for ad hoc temporary record relationship management. In an embodiment of the invention, a method for ad hoc temporary record relationship management is provided. The method include selecting an instance of a data object in memory of a computer and persisted in a database of a database driven application and creating in the memory of the computer a different instance of a different data object referencing the selected instance of the data object and relating the selected instance of the data object to an instance of yet a further data object also persisted in the database. The method also includes storing the created different instance of the different data object in a collection of instances of the different data object and querying the collection of instances of the different data object for a particular instance of the further data object. Of note, the querying can produce a result set of data objects related to the particular instance of the further data object. Finally, the method includes processing the result set in the database driven application.

In one aspect of the embodiment, the created different instance of the different data object is removed from the collection responsive to either of the referenced instance and the related instance being removed from the database. In another aspect of the embodiment, the created different instance of the different data object includes a data member specifying a source module of the database driven application for the referenced instance and also a data member specifying a source module of the related instance. In yet another aspect of the embodiment, the different data object derives from the data object of the selected instance. Finally, in even yet another aspect of the embodiment, the selected instance is a news item of a news feed selected by one end user of the application and the different instance is a record of a different end user of the database driven application.

In another embodiment of the invention, a database driven data processing system is configured for ad hoc temporary record relationship management. The system includes a host server with at least one processor and memory configured for communicative coupling to different client computers over a computer communications network. The system also includes a database coupled to the host server and a database management system executing in the memory of the host server and managing different data objects in the database. Finally, the system includes an ad hoc tagging and pegging module executing in the memory of the host server. The module includes program code enabled upon execution to select an instance of a data object in the memory and persisted in the database, to create in the memory a different instance of a different data object referencing the selected instance of the data object and relating the selected instance of the data object to an instance of yet a further data object also persisted in the database, to store the created different instance of the different data object in a collection of instances of the different data object, to query the collection of instances of the different data object for a particular instance of the further data object, the querying producing a result set of data objects related to the particular instance of the further data object, and to process the result set in the database management system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for ad hoc temporary record relationship management. In accordance with an embodiment of the invention, an object in a database can be selected through a graphical user interface and an additional object can be created that references the selected object according to a keyword. Optionally, the additional object can reference a secondary object also presented through the graphical user interface to be temporarily related to the selected object. Thereafter, the additional object can be temporarily stored in the database as a tag. At any time queries can be conducted against the tags to produce an ad hoc listing of objects associated with a common keyword. In this way, ad hoc relationships between objects in a database can be created and queried upon through the graphical user interface.

Figure 1:
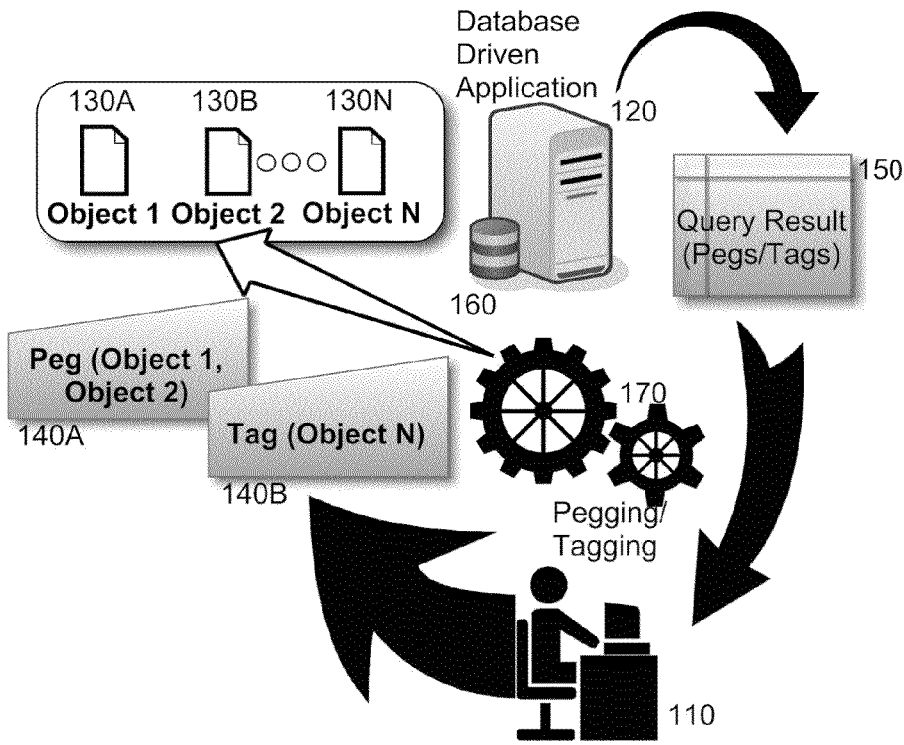
FIG. 1 is a pictorial illustration of a process for ad hoc temporary record relationship management.

In further illustration, FIG. 1 pictorially shows a process for ad hoc temporary record relationship management. As shown in FIG. 1, an end user 110 interacting with a database driven application 120 can select one or more objects 130A, 130B, 130N in database 160 for pegging and/or tagging by way of pegging/tagging logic 170. In this regard, in respect to pegging, the end user 110 can select through a user interface to the database driven application 120 a particular object 130A in the database 160 and can associate another of the objects 130B in the database 160 therewith. The resulting association can be stored as a peg 140A in the database 160.

Alternatively, in respect to tagging, the end user 110 can select through the user interface to the database driven application 120 a particular object 130N in the database 160 and can apply a tag 140B thereto—specifically a string. In either circumstance, subsequently, the pegs 140A and tags 140B stored in the database 160 can be queried in order to produce a query result 150 for use by the database driven application 120. Further, in both cases, the pegs 140A and tags 140B can be deleted responsive to any associated one of the objects 130A, 130B, 130N having been removed from the database 160.

For example, different records displayed in a user interface to the database driven application 120 can be arbitrarily associated in respectively different pegs 140A with other records stored in the database 160 of the database driven application. Subsequently, the pegs 140A can be queried for a particular associated record to produce a subset of records associated with the particular associated record. Likewise, different records in the database 160 can be tagged with different strings in respectively different tags 140B. Subsequently, the tags 140B can be queried for a particular string to produce a subset of the records in the database 160 that have been tagged with the particular string.

Figure 2:
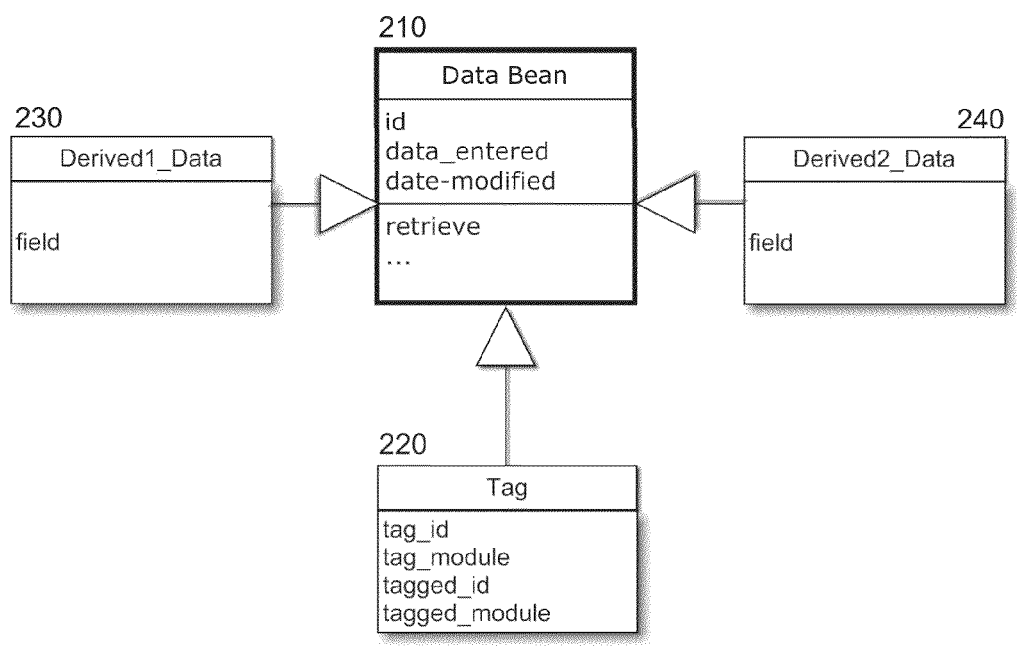
FIG. 2 is a diagram of a model for ad hoc temporary record relationship management.

Of note, the pegs 140A and tags 140B can be modeled as an extension to a core data storage class of the object for which the pegs 140A and tags 140B are to be applied. In yet further illustration, FIG. 2 diagrammatically shows a model for ad hoc temporary record relationship management. Specifically, as shown in FIG. 2, a class for a base object 210 can be represented according to a data bean of a component based architecture. The class for the base object 210 can include, by way of example, one or more data members, and one or more method members. Classes for a derived data object 230 can extend the data and method members of the class for the base object 210. Even further, a tag class 220 can derive from the class for the base object 210. The tag class 220 can include as data members, an identification of a selected object for which a corresponding instance of the tag class 220 has been applied, and an identifier of a module of the underlying application in which the selected object had been tagged.

The tag class 220 additionally can include as data members, an identifier of a different object associated by the instance of the tag class 220 with the selected object, and a module of the underlying object from which the different object had been sourced. In this way, a collection of instances of the tag class 220 can be queried by identifier of a selected object in order to produce a list of ad hoc associated objects with the selected object, or alternatively, a collection of instances of the tag class 220 can be queried by identifier of an associated object to find all selected objects for which the associated object had been associated.

Figure 3:
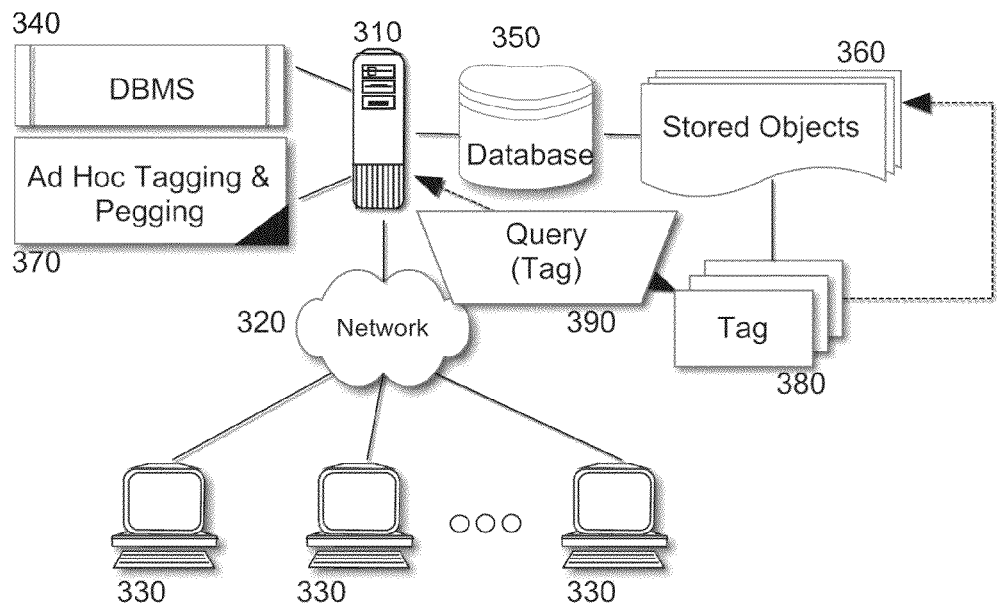
FIG. 3 is a schematic illustration of a database driven data processing system configured for ad hoc temporary record relationship management; and, FIG. 4 is a flow chart illustrating a process for ad hoc temporary record relationship management.

The process illustrated in connection with FIG. 1 can be implemented within a database driven data processing system. In even yet further illustration, FIG. 3 schematically shows a database driven data processing system configured for ad hoc temporary record relationship management. As shown in FIG. 3, the system can include a host server 310 configured for communicative coupling to different client computers 330 over computer communications network 320. The host server 310 can support in memory the operation of a database management system 340 enabled to manage data objects 360 stored in a database 350.

Of note, ad hoc tagging and pegging module 370 can be coupled to the database management system 340. The ad hoc tagging and pegging module 370 can include program code that when executes in memory of the host server 310 by one or more processors of the host server 310, can apply different tags 380 to different ones of the stored objects 360. Each of the tags 380 can apply a string tag to a corresponding one of the stored objects 360, or a reference to another of the stored objects 360 in the database 350. The program code of the ad hoc tagging and pegging module 370 yet further can be enabled upon execution in the host server 310 to conduct query operations 390 against the tags 380, for example by querying the tags 380 by name for a list of corresponding stored objects 360 tagged with the name, or by querying the tags 380 by a particular one of the stored objects 360 for a list of others of the objects 360 ad hoc related by the tags 380 to the particular one of the stored objects 360.

Figure 4:
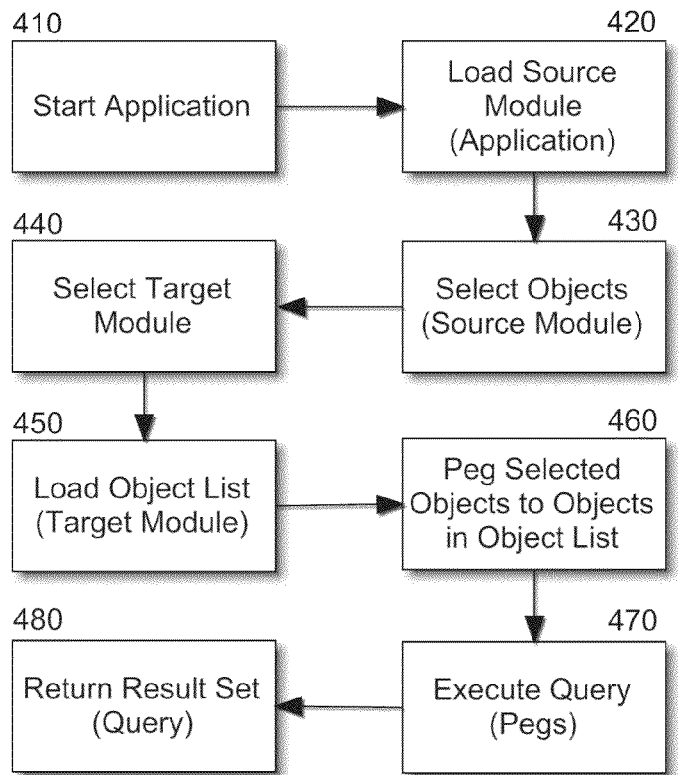

In even yet further illustration of the operation of the ad hoc tagging and pegging module 370, FIG. 4 is a flow chart illustrating a process for ad hoc temporary record relationship management. Beginning in block 410, a multi-module database driven application can be launched and a particular one of the modules can be loaded for execution in block 420. In block 430, a data object in the particular one of the modules can be selected for pegging and in block 440, a different one of the modules of the multi-module database driven application can be selected from which a list of encapsulated data objects can be loaded in block 450. In block 460, a particular one of the encapsulated data objects of the different one of the modules can be selected for pegging to the data object of the particular one of the modules of the multi-module database driven application.

Thereafter, in block 470 a query can be executed against one or more stored pegs for the multi-module database driven application. For example, a listing of all related ones of the data objects for a selected data object can be requested. The result set produced by the query then can be processed by the modules of the multi-module database driven application in block 480. For example, to the extent that the selected data object is a data item in a data feed of news items selected through a user interface to a feed module by one end user, and the related records are contact records for other users of the application, the query identifying all contacts related to a particular news item can be processed by the feed module to present the news item to the news feeds of each of the other users related by a corresponding peg of the selected data object.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for ad hoc temporary record relationship management comprising:
   selecting an instance of a data object the instance being both in memory of a computer and also persisted in a database of a database driven application;
   creating in the memory of the computer a different instance of a different data object, the different instance referencing the selected instance of the data object and relating the selected instance of the data object to an instance of yet a further data object, the instance of the further data object also being persisted in the database;
   storing the created different instance of the different data object in a collection of instances of the different data object;
   querying the collection of instances of the different data object for a particular instance of the further data object, the querying producing a result set of data objects related to the particular instance of the further data object; and,
   processing the result set in the database driven application.

2. The method of claim 1, wherein the created different instance of the different data object is removed from the collection responsive to either the selected instance being referenced by the different instance or the related instance related by the different instance being removed from the database.

3. The method of claim 1, wherein the created different instance of the different data object includes a data member specifying a source module of the database driven application for the selected instance being referenced by the different instance and also a data member specifying a source module of the related instance related by the different instance.

4. The method of claim 1, wherein the different data object derives from the data object of the selected instance.

5. The method of claim 1, wherein the selected instance is a news item of a news feed selected by one end user of the application and the different instance is a record of a different end user of the database driven application.

6. A database driven data processing system configured for ad hoc temporary record relationship management, the system comprising:
   a host server with at least one processor and memory configured for communicative coupling to different client computers over a computer communications network;
   a database coupled to the host server;
   a database management system executing in the memory of the host server and managing different data objects in the database; and,
   an ad hoc tagging and pegging module executing in the memory of the host server, the module comprising program code enabled upon execution to select an instance of a data object the instance being both in memory of a computer and also persisted in the database, to create in the memory a different instance of a different data object, the different instance referencing the selected instance of the data object and relating the selected instance of the data object to an instance of yet a further data object, the instance of the further data object also being persisted in the database, to store the created different instance of the different data object in a collection of instances of the different data object, to query the collection of instances of the different data object for a particular instance of the further data object, the querying producing a result set of data objects related to the particular instance of the further data object, and to process the result set in the database management system.

7. The system of claim 6, wherein the created different instance of the different data object is removed from the collection responsive to either the selected instance being referenced by the different instance or the related instance related by the different instance being removed from the database.

8. The system of claim 6, wherein the created different instance of the different data object includes a data member specifying a source module of a database driven application for the selected instance being referenced by the different instance and also a data member specifying a source module of the related instance related by the different instance.

9. The system of claim 6, wherein the different data object derives from the data object of the selected instance.

10. The system of claim 6, wherein the selected instance is a news item of a news feed selected by one end user of the database management system and the different instance is a record of a different end user of the database management system.

11. A computer program product for ad hoc temporary record relationship management, the computer program product comprising:
   a computer readable storage medium comprising a device having computer readable program code embodied therewith, the computer readable program code comprising:
   computer readable program code for selecting an instance of a data object the instance being both in memory of a computer and also persisted in a database of a database driven application;
   computer readable program code for creating in the memory of the computer a different instance of a different data object, the different instance referencing the selected instance of the data object and relating the selected instance of the data object to an instance of yet a further data object, the instance of the further data object also being persisted in the database;
   computer readable program code for storing the created different instance of the different data object in a collection of instances of the different data object;
   computer readable program code for querying the collection of instances of the different data object for a particular instance of the further data object, the querying producing a result set of data objects related to the particular instance of the further data object; and, computer readable program code for processing the result set in the database driven application.

12. The computer program product of claim 11, wherein the created different instance of the different data object is removed from the collection responsive to either the selected instance being referenced by the different instance or the related instance related by the different instance being removed from the database.

13. The computer program product of claim 11, wherein the created different instance of the different data object includes a data member specifying a source module of the database driven application for the selected instance being referenced by the different instance and also a data member specifying a source module of the related instance related by the different instance.

14. The computer program product of claim 11, wherein the different data object derives from the data object of the selected instance.

15. The computer program product of claim 11, wherein the selected instance is a news item of a news feed selected by one end user of the application and the different instance is a record of a different end user of the database driven application.

* * * * *